US012749028B2

(12) United States Patent
Wynn et al.

(10) Patent No.: US 12,749,028 B2
(45) Date of Patent: Sep. 29, 2026

(54) SYSTEMS AND METHODS FOR PROVIDING AN ARTIFICIAL INTELLIGENCE-BASED PLANNING ASSISTANT

(71) Applicant: JPMORGAN CHASE BANK, N.A., New York, NY (US)

(72) Inventors: Jason Wynn, Huntington Beach, CA (US); Ken Litton, Old Greenwich, CT (US); Allison Beer, Bronxville, NY (US); Jonathan Hamblett, Fort Myers, FL (US); Christopher Stang, Malibu, CA (US); Jonathan LaLima, Manalapan, NJ (US); Katie Hainsey, New York, NY (US); Ricardo Mela, Hartsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/668,981

(22) Filed: May 20, 2024

(65) Prior Publication Data

US 2024/0386336 A1 Nov. 21, 2024

Related U.S. Application Data

(60) Provisional application No. 63/503,480, filed on May 21, 2023.

(51) Int. Cl.
*G06Q 10/02* (2012.01)
*G06T 5/50* (2006.01)
*G06T 5/60* (2024.01)

(52) U.S. Cl.
CPC ............. *G06Q 10/025* (2013.01); *G06T 5/50* (2013.01); *G06T 5/60* (2024.01); *G06T 2207/20221* (2013.01)

(58) Field of Classification Search
CPC ........ G06Q 10/02–10/05; G06Q 50/14; G06T 5/60
See application file for complete search history.

(56) References Cited

U.S. PATENT DOCUMENTS

2009/0216633 A1* 8/2009 Whitsett ............... G06Q 50/14 705/26.1
2015/0127486 A1* 5/2015 Advani ................. G06Q 50/14 705/26.41

(Continued)

OTHER PUBLICATIONS

Bui, Using Artificial Intelligence and Machine Learning to Create a Travel Planning System Based on Users' Preferences and Behaviours, Diss. Toronto Metropolitan University, 2021 (Year: 2021).*

(Continued)

*Primary Examiner* — Daniel Vetter
(74) *Attorney, Agent, or Firm* — GREENBERG TRAURIG LLP

(57) ABSTRACT

In some aspects, the techniques described herein relate to a method including: receiving, from a user interface, input travel data; providing the input travel data to a machine learning engine as input to the machine learning engine; receiving, as output from the machine learning engine, predictions of travel services, where the predictions of travel services are based on the input travel data; formatting a digital itinerary including the predictions of travel services as line-item recommendations for the user on the digital itinerary; and presenting the digital itinerary to the user via the interface.

3 Claims, 5 Drawing Sheets

(56) References Cited

U.S. PATENT DOCUMENTS

| | | | | |
|---|---|---|---|---|
| 2015/0278970 | A1* | 10/2015 | Valverde, Jr. | G06Q 50/14 705/26.7 |
| 2018/0336642 | A1 | 11/2018 | Miller | |
| 2019/0228347 | A1 | 7/2019 | Mcspadden, II et al. | |
| 2019/0378054 | A1* | 12/2019 | Pinel | G06Q 10/02 |
| 2021/0097893 | A1* | 4/2021 | Klappert | G06Q 10/02 |
| 2021/0248696 | A1* | 8/2021 | Reis et al. | G06Q 10/02 |
| 2021/0272253 | A1 | 9/2021 | Lin et al. | |
| 2022/0070389 | A1 | 3/2022 | Tangeland et al. | |
| 2024/0232729 | A1* | 7/2024 | Bouvrie | G06Q 10/02 |
| 2025/0104169 | A1* | 3/2025 | Jouve | G06Q 50/14 |

OTHER PUBLICATIONS

Badouch, et al., Personalized travel recommendation systems: a study of machine learning approaches in tourism, Journal of Artificial Intelligence Machine Learning and Neural Network, vol. 33, 2023, pp. 35-45 (Year: 2023).*

International Search Report and Written Opinion of the International Searching Authority, dated Jul. 15, 2024, from corresponding International Application No. PCT/US2024/030382.

* cited by examiner

SYSTEMS AND METHODS FOR PROVIDING AN ARTIFICIAL INTELLIGENCE-BASED PLANNING ASSISTANT

RELATED APPLICATIONS

This application claims priority to, and the benefit of, U.S. Provisional Pat. App. Ser. No. 63/503,480, filed May 21, 2023, the disclosure of which is hereby incorporated, by reference, in its entirety.

BACKGROUND

1. Field of The Invention

Aspects generally relate to systems and methods for providing an artificial intelligence-based planning assistant.

2. Description of the Related Art

A number of disconnected data sets contain information necessary for travel. Due to their disconnected nature, the information within these systems remain unused. A solution using artificial intelligence (AI) and machine learning (ML) to integrate decentralized travel options into a digital itinerary would be beneficial to both consumers and organizations.

SUMMARY

In some aspects, the techniques described herein relate to a method including: receiving, from a user interface, input travel data; providing the input travel data to a machine learning engine as input to the machine learning engine; receiving, as output from the machine learning engine, predictions of travel services, where the predictions of travel services are based on the input travel data; formatting a digital itinerary including the predictions of travel services as line-item recommendations for the user on the digital itinerary; and presenting the digital itinerary to the user via the interface.

In some aspects, the techniques described herein relate to a method for determining a travel itinerary comprising: receiving, from a user interface, a travel request; deriving, using a first machine learning engine, input travel data from one or more of: a browsing history, a purchase history, a user preference, and a travel history; providing the input travel data to a second machine learning engine; determining, by the second learning engine, travel services based on the input travel data; receiving, as output from the second machine learning engine, the determined travel services; verifying the digital itinerary using a check machine learning engine that compares the determined travel services to real world data and the user preferences; formatting, using a backend associated with a server, a digital itinerary including the determined travel services as line-item recommendations for a user; and presenting the digital itinerary to the user via the user interface.

Further aspects relate to: further comprising generating an image of a user associated with the user preference at an identified location, wherein the identified location is based on the determined travel services, further comprising generating a video of a user associated with the user preference at an identified location, wherein the identified location is based on the determined travel services, further comprising generating the video with the user and a traveling companion of the user, further comprising wherein the identified location is one or more of a hotel room, a monument, a hotel lobby, and a recreational attraction, further comprising generating an image of a user associated with the user preference at an identified location, wherein the identified location is based on the determined travel services, further comprising generating a travel option between a travel service location identified based on the determined travel services and the identified location, and/or wherein verifying the digital itinerary comprises comparing the travel option against a historical travel option and determining feasibility.

In some aspects, the techniques described herein relate to a computer readable medium comprising instructions which, when executed by a processor, cause the processor to: receive, from a user interface, a travel request; derive, using a first machine learning engine, input travel data from one or more of: a browsing history, user preferences, and travel history; provide the input travel data to a second machine learning engine; determine, by the second learning engine, travel services based on the input travel data; receive, as output from the second machine learning engine, of the determined travel services; format, using a backend associated with a server, a digital itinerary including the determined travel services as line-item recommendations for a user on the digital itinerary; and present the digital itinerary to the user via the user interface.

A computer readable medium comprising instructions which, when executed by a processor, cause the processor to: receive, from a user interface, a travel request; derive, using a first machine learning engine, input travel data from one or more of: a browsing history, user preferences, and travel history; provide the input travel data to a second machine learning engine; determine, by the second learning engine, travel services based on the input travel data; receive, as output from the second machine learning engine, of the determined travel services; format, using a backend associated with a server, a digital itinerary including the determined travel services as line-item recommendations for a user on the digital itinerary; and present the digital itinerary to the user via the user interface.

DETAILED DESCRIPTION

Figure 1:
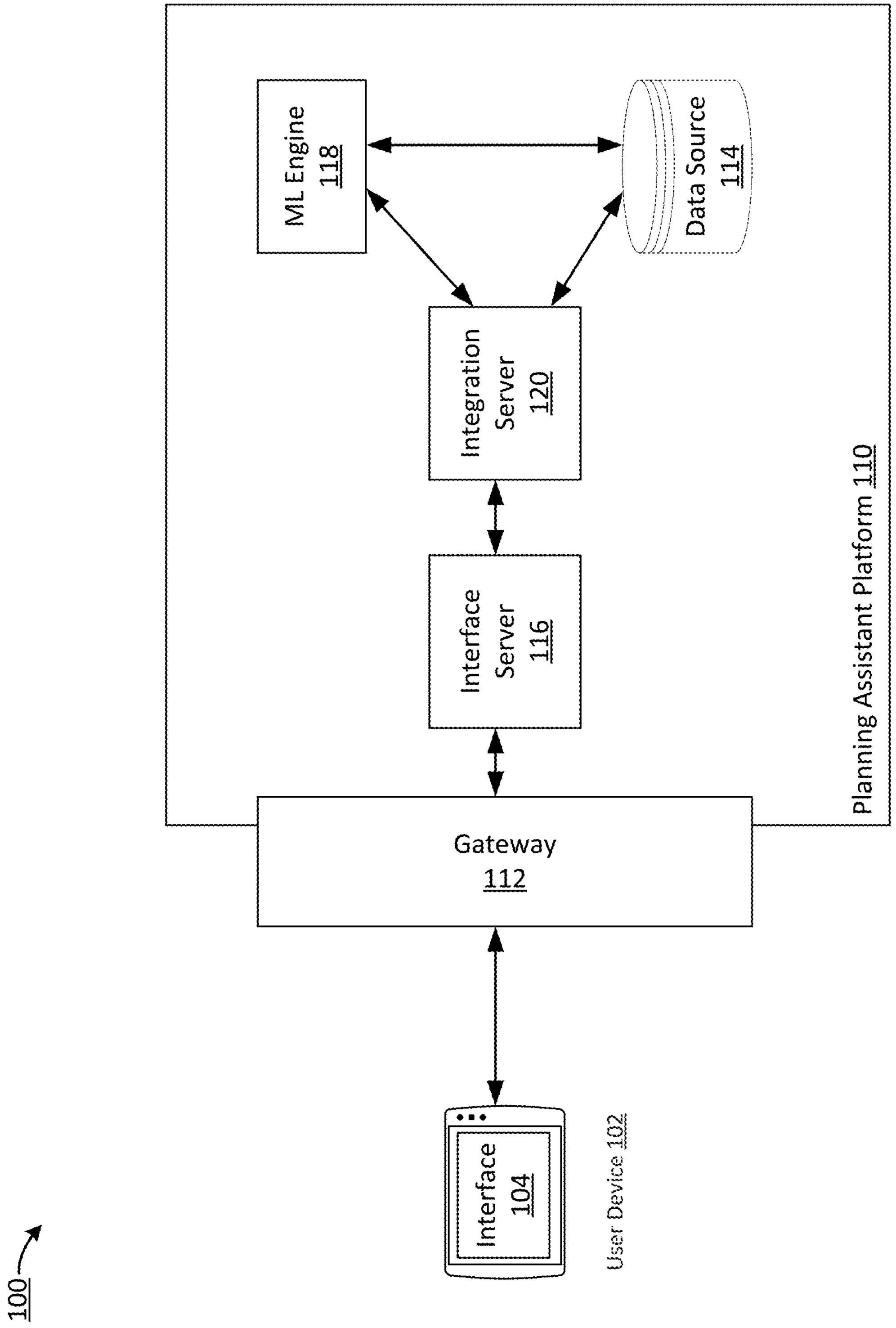
FIG. 1 is a block diagram of a system for providing an artificial intelligence-based planning assistant, in accordance with aspects.

Aspects generally relate to systems and methods for providing an artificial intelligence-based planning assistant.

Aspects may provide a planning assistant platform for use by consumers and providing organizations. Aspects may include an interactive digital interface that may be used directly by consumers or by agents of a providing organization on a consumer's behalf. An interface may provide a user session based on a user account of a consumer/customer and may include various prompts that accept input from the consumer. An interface may be provided through any suitable digital channel. For instance, an interface may be a graphical interface of an application (e.g., a mobile application) or of a website. The interface may be in operative communication with a providing organization's backend technology infrastructure, including requisite hardware and software for providing both the interface and the backend technological services of the platform. Exemplary backend technology may include application servers, web servers, machine learning model engines, etc.

A platform interface may facilitate booking of various aspects of a trip (e.g., a vacation, holiday, or business trip) including provisions for lodging and dining. Aspects may further include integrated payment options including 1-click payment options for paying for a full or partial itinerary using payment products such as credit cards and debit cards or using other methods such as reward points or lending products. Aspects may develop and present a consumer's itinerary through an interface and may provide features that facilitate sharing of an itinerary with other such as friends and family members. A digital itinerary provided by a platform may include rich digital features such as text that corresponds to visual and auditory enhancements. A platform may store a prepared itinerary as associated with a consumer's user profile such that the consumer can retrieve the itinerary for later viewing and/or updating.

A planning assistant platform may include and employ various technologies such as generative artificial intelligence (AI) and machine learning (ML) models. ML models may include Large Language Models (LLMs), Generative Adversarial Networks (GANs), Variational Encoders (VAEs), and Natural Language Processing (NLP) models. Data sources for training and validating models, and for use as model input, include customer profiles, travel preferences, commerce benefits, loyalty rewards, payment options, dining preferences, and historical itineraries. Third-party data sources may include available flights, lodging, and dining options gathered from various sources such as public application programming interfaces (APIs). Other public sources of data include government and open-source (e.g., public domain) data in categories such as city/country details, weather, travel alerts, etc.

In accordance with aspects, a user may log into a platform using an interface such as a mobile application (app) or website. One or more prompts may allow the user to begin using the service via the interface, or to ask for assistance from an agent of the providing organization. Interface components may also facilitate user input of data such as destination information, dining preferences, lodging preferences, and other trip/destination data. In some aspects a customer may enter this information directly into the interface, while in other aspects an agent may enter the information into a corresponding interface on the customer's behalf. In some aspects, a user-facing interface may be updated and displayed to a user as an agent inputs data on the user's behalf (e.g., in real time).

FIG. 1 is a block diagram of a system for providing an artificial intelligence-based planning assistant, in accordance with aspects. System 100 includes planning assistant platform 110. Planning assistant platform 110 includes gateway 112, interface server 116, integration server 120, data source 114, and machine learning (ML) engine 118. Additionally, user device 102 may display interface 104 to a user.

In accordance with aspects, planning assistant platform 110 includes interface server 116. Interface server 116 may be any necessary or desired server for serving interface 104, such as an application server (e.g., in the case that interface 104 is provided via a mobile application) or a web server (e.g., in the case that interface 104 is provided via a publicly available website) user device 102 may be in operative communication with planning assistant platform 110 via gateway 112. Gateway 112 may be any necessary or desirable gateway and may represent both hardware and/or software gateway layers. For instance, gateway 112 may be a firewall or router that directs web traffic to interface server 116. In other aspects, gateway 112 may be an API gateway that forwards API method calls to interface server 116. A user (either a consumer/customer user, or an agent user) may interact with interface 104 and may provide relevant input data, such as trip/travel data, to interface 104. Interface 104, may send the input data to interface server 116.

Interface server 116 may be in operative communication with integration server 120 and may receive input data collected by interface server 116. Integration server 120 may be in operative communication with ML engine 118 and data source 114. Integration server 120 may be in operative communication with other services provided by other platforms of a providing organization or provided by partners of a providing organization. Other services may include an itinerary booking platform, payment systems, customer profile storage and retrieval systems, reward platforms, and dining platforms.

Integration server 120 may receive travel input data from interface server 116 and may pass some or all of the travel input data to ML engine 118. ML engine 118 may receive the travel input data and may provide, as output, predictions of travel services that may be highly relevant to a user based on the input data. Such predictions may then be used as recommendations or as itinerary line items on a digital itinerary that is associated with the user. For instance, ML engine 118 may provide predictions/recommendations with respect to lodging dining and recreational services for a given time period (e.g., a time period specified in the travel input data and the represents the time period that the user would be vacationing or traveling for work).

ML engine 118 may be trained and validated using one or more of historical travel data, browsing history, and payment transaction history. Other input to ML engine 118 may be collected from the user's profile or, (e.g., in the case of a new user) may be collected as input to interface 104 and stored associated with, or as a part of, the user's profile. A user profile may be associated with a user's travel preferences. For instance, a user profile may include or be associated with data such as a user's preferred airline, a user's preferred lodging organizations, a user's preferred dining experiences, and other input data that may be received via interface 104. A user's input travel data may further include a preferred travel activity (e.g., participation in a sport, viewing a sport, attending a concert, visiting monuments or museums). A user's input travel data may further include a budget limit. A user's input travel data may further include a preferred payment method, a reward point system used by the user, an available balance of reward points, etc.

A user profile may further include past itineraries that have been accepted by the user. Past itineraries may be stored and used as input data to ML engine 118. Past itineraries may also be used to recursively train a ML model executed by ML engine 118.

Data source 114 may include one or more data storage systems (e.g., a relational database, a data warehouse, a data lake, etc.). Data source 114 may store and provide access to user profiles. Data source 114 may also store and provide access to training/validation data used on conjunction with ML engine 118. Data source 114 also represents data sources external to planning assistant platform 110 and/or the providing organization that provides planning assistant platform 110. For instance, data source 114 may include public gateways for accessing data from partner organizations, governmental organizations, third party organizations, etc. As non-limiting examples, data source 114 may include a browsing history, a transportation schedule, a payment transaction history, an event calendar, a recommended or popular lodge/restaurant/event/destination list, or a rewards program benefit.

In accordance with aspects, output from ML engine 118 may be received by integration server 120, and 120 may format the output into a digital itinerary that may be displayed to a user via interface 104 and user device 102. Integration server 120 may generate a digital itinerary using other data from both internal and external sources, such as payment data/accounts for paying for the services recorded in the itinerary, reward point data including points that were applied or may be applied to one or more aspects of the itinerary, alternate or competing line items on the itinerary that the user may select from, etc. Integration server 120 may store the itinerary as a part of or as associated with the user's profile, and may provide the itinerary for viewing via interface 104. The user may login using authentication information to retrieve, update, approve, etc., the itinerary. The user may be offered to purchase one or more component parts necessary for the itinerary (e.g., primary and secondary transportation, hotel).

Figure 2:
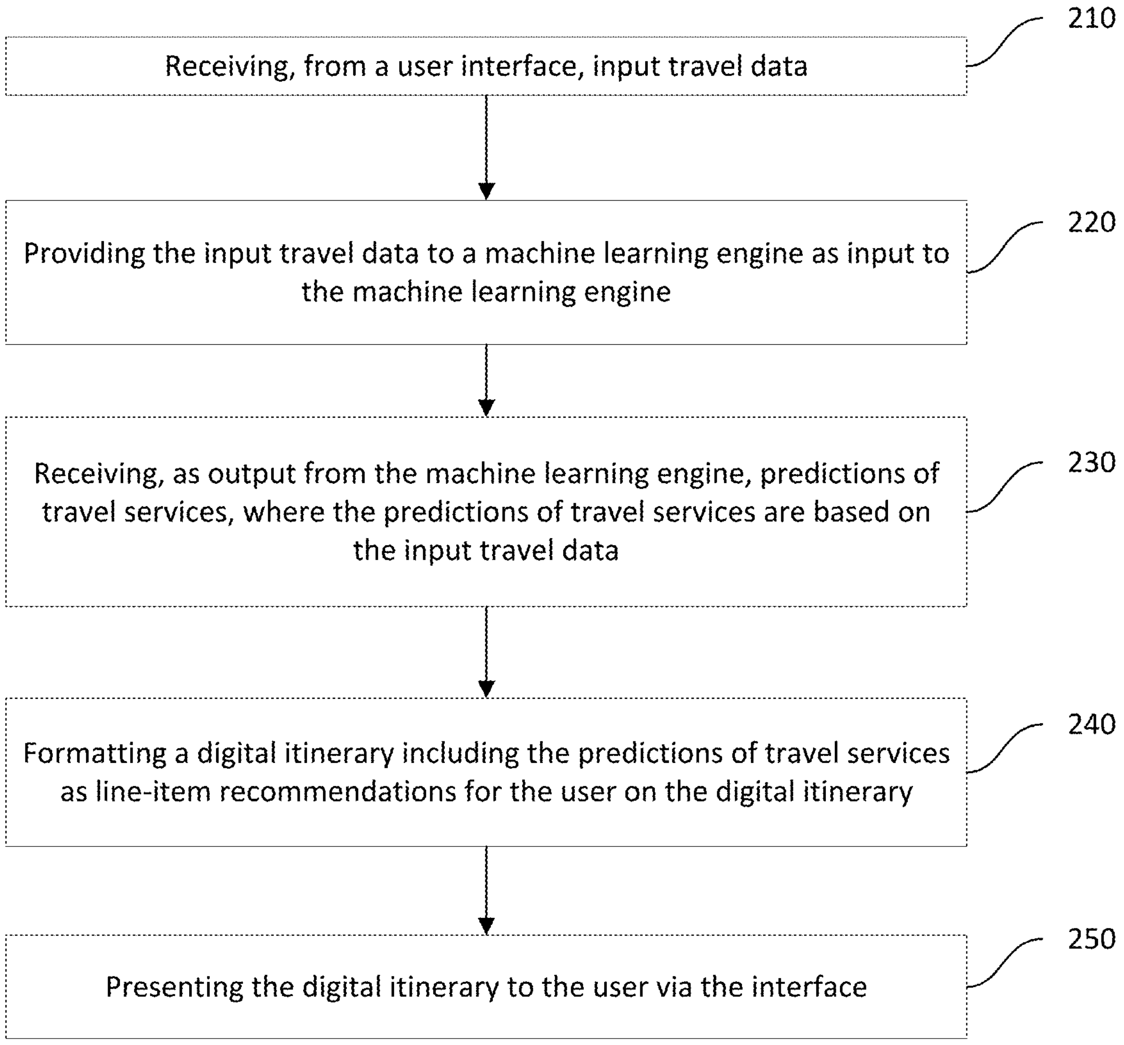
FIG. 2 is a logical flow for providing an artificial intelligence-based planning assistant, in accordance with aspects.

FIG. 2 is a logical flow for providing an artificial intelligence-based planning assistant, in accordance with aspects.

Step 210 includes receiving, from a user interface and at an initializer module (e.g., part of integration server 120), input travel data. Input travel data may include one or more of an arrival time and/or a departure time, a destination, a length of time at the destination, a starting mode of travel, a preferred travel service provider, a desired event, and a desired activity. Input travel data may be retrieved from a data source (e.g., data source 114).

In some embodiments, the user interface may receive a travel request indicating one or more of: a start time/date and/or a duration of a trip, a lodging and/or event accommodation, a desired event, and a desired activity. Input travel data may be derived from the travel request by the initializing module. For example, an arrival time and a departure time may be derived from input data of a start time/date of a trip or a desired event/activity. As another example, a lodging or event accommodation may be derived from input data of a destination or an arrival time and/or departure time. As another example, a lodge, a restaurant, an event, or a destination, may be identified based on proximity to a destination (e.g., a city) identified by the travel request.

In some embodiments, the initializer may assign weights to derived input travel data based on one or more of: a third party review, an ability to use benefits, a user profile selection, a distance to travel, a preferred travel method (e.g., walk, train), a browsing history, a past itinerary history, a preferred hotel or restaurant provider, and a preferred travel service provider. In some embodiments, the initializer may assign weights based on a rewards program affiliation with one or more of a hotel, a restaurant, and a preferred travel service provider. In some embodiments, a set of hotels/restaurants/travel services may be weighted higher than a different set. In some embodiments, the initializer may group equally available or viable options.

Step 220 includes providing from the initializer to the input travel data and/or the travel request to a machine learning engine as input to the machine learning engine. The initializer may determine to also include one or more of a preferred hotel provider/property, a preferred restaurant provider, and a preferred travel service provider (e.g., an airline, a train company, a taxi company etc.) as input to the machine learning engine based on a user profile.

Step 230 includes receiving, as an output from the machine learning engine and as an input to an integration module (e.g., part of integration server 120), predictions of travel services, where the predictions of travel services are based on the input travel data. The predicted travel services may include one or more of a mode of transportation, a time for transportation, a recommended lodge, a recommended restaurant, a recommended event, and/or a recommended activity. Step 230 may be iterated until predicted travel services are generated for each mode of transportation and/or recommended lodge, restaurant, event, and/or activity.

In some embodiments, the machine learning engine may use a number of criteria, both from the travel request and from derived input travel data. For example, the predicted travel services may be a lodge near a desired event, where the travel request is the desired event and the derived input travel data are a desired distance from the desired event and/or a budget for the lodge, for dates during the event and/or on either side of the event. As another example, the predicted travel service may be a mode of transportation and a time for transportation to reach a desired event, a travel request. As another example, the predicted travel service may be a mode of transportation and a time for transportation to reach a recommended event, a predicted travel service.

Step 240 includes, at an integration module (e.g., part of integration server 120), formatting a digital itinerary including the predictions of travel services as line-item recommendations for the user on the digital itinerary. In some embodiments, the digital itinerary may include the travel request and/or the input travel data.

For example, the digital itinerary may list each mode of transportation and proposed time of transportation, each event and proposed time of event, each lodge and proposed stay time, each activity and proposed time of activity, and each destination and proposed time for the destination.

Step 250 includes outputting the digital itinerary from the integration module (e.g., part of integration server 120) and presenting the digital itinerary to the user via the interface. In some embodiments, the digital itinerary may be presented as a questionnaire for the user to accept, decline, or edit the input travel data and/or the predicted travel service. The digital itinerary may be iteratively generated based on a single user response or based on a number of responses.

In some embodiments, presenting the digital itinerary to the user via the interface may include generating an image or a video. Generating an image or video may include retrieving a picture or a video associated with a destination (e.g., a photo of the Eiffel Tower). The generated image may be shown alongside a line item or available through a link associated with the line item. In some embodiments, generating an image or a video may include further retrieving an image of a user and/or one or more traveling companions and, using a machine learning engine, generating an image or a video of the user at the destination (e.g., a photo of the user at the Eiffel Tower). For example, the generation of the image may involve cropping around a user's face and/or body and adjusting one or more of perception, intensity, shadows, highlights, brightness, color balance, contrast, saturation, dynamism, shadows, sharpness, red eye removal, skin smoothing, objects, of the background and/or the user's face to match (e.g., reduce variance of the user image and the destination image to below a threshold). In some embodiments, the user's face may be re-generated from a user image to match the destination image in the ways disclosed herein (e.g., to match an expected direction angle of the user's face at the destination, a perspective of the user's face from the angle of a view of the destination reflected in the destination image). In another example, a pose of a user associated with the destination may be determined (e.g., from context of an activity associated with the destination) and a pose of the user can then be generated from the user's face and features to match the one associated with the destination, and displayed in the generated image and/or video. The pose may include an angle and/or position of the user's neck/torso/arms/legs. In some embodiments, the generated image or video may be of a tour of a destination, activity, or event (e.g., a golf course, a hotel room, a hotel lobby). In some embodiments, generating the image or video may be performed by a machine learning engine.

In some embodiments, presenting the digital itinerary may be in the form of a series of images or an end-to-end video of the determined destinations with or without the user. Adjustments may be made to the images and/or video for consistency as described herein.

Figure 3:
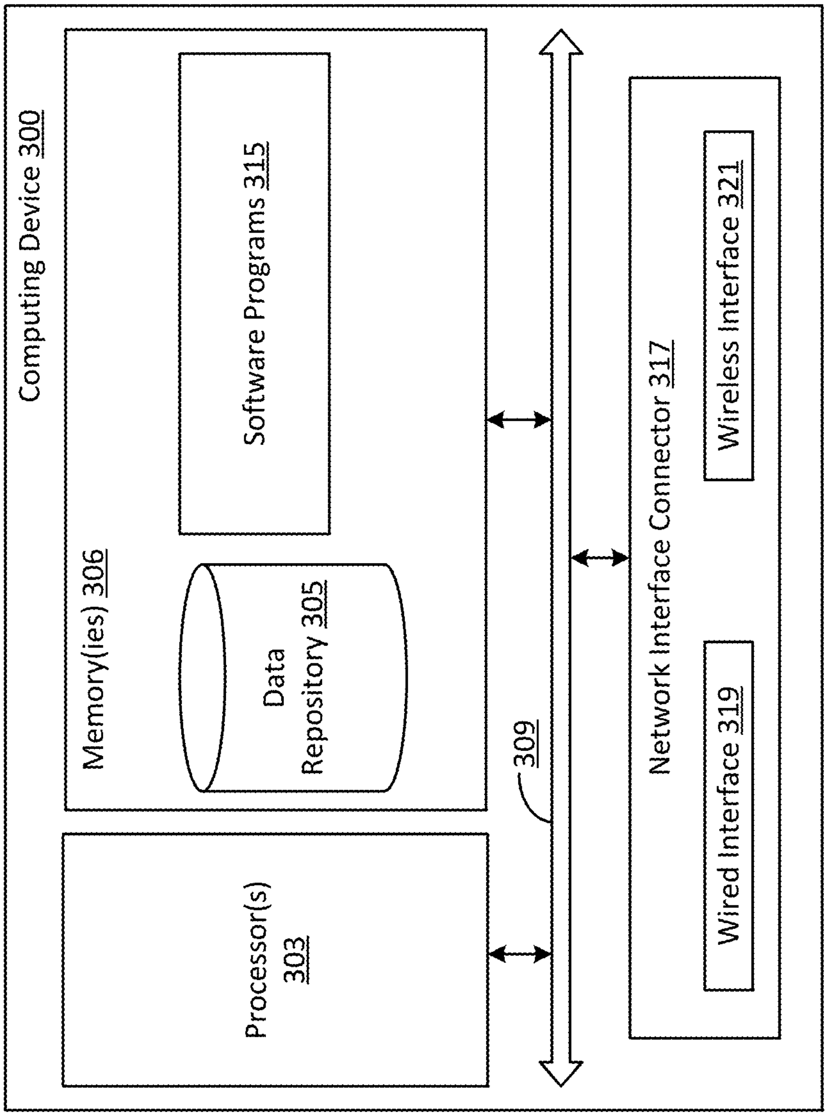
FIG. 3 is a block diagram of a computing device for implementing certain aspects of the present disclosure.

FIG. 3 is a block diagram of a computing device for implementing certain aspects of the present disclosure. FIG. 3 depicts exemplary computing device 300. Computing device 300 may represent hardware that executes the logic that drives the various system components described herein. For example, system components such as an interface server, an integration server, a ML engine, an interface, various database engines and database servers, and other computer applications and logic may include, and/or execute on, components and configurations like, or similar to, computing device 300.

Computing device 300 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 300 may also have user interface components, such as a screen for displaying graphical user interfaces and receiving input from the user, a mouse, a keyboard and/or other input/output components (not shown).

Figure 4:
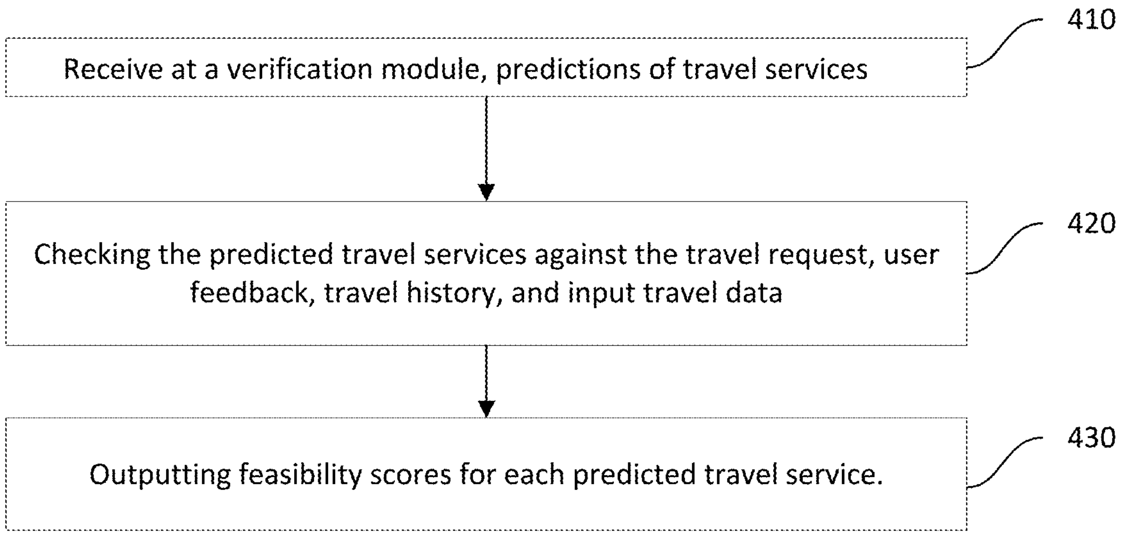
FIG. 4 is a logical flow for providing an artificial intelligence-based planning assistant, in accordance with aspects.

FIG. 4 is a logical flow for providing an artificial intelligence-based planning assistant, in accordance with aspects.

Step 410 includes receiving, from an integration module (e.g., part of integration server 120) and to a verification module (e.g., part of integration server 120), predictions of travel services.

Step 420 includes, at the verification module, checking the predicted travel services against one or more of the travel request, the user feedback, the travel history, and derived input travel data to provide a feasibility score. The feasibility score may be based on one or more of a budget, an amount of activity in a given time period, a use of user benefits (e.g., points of a rewards program), and a likelihood of arriving at an activity, destination, or event on time. If the feasibility score for a predicted travel service is below a lower threshold, the verification module may assign the predicted travel service an indication of infeasibility to the integration module. The integration module, on receiving an indication of infeasibility, may iterate until a lower threshold is met or a predicted travel service is eliminated or altered. During an iteration, an alternate mode of travel (e.g., rental car or taxi/rideshare if a train is infeasible or vice versa) or travel through a different city can be considered. If the feasibility score for a predicted travel service is above a lower threshold but below an upper threshold, the verification module may assign the predicted travel service an indication of low feasibility. The integration module, on receiving a low feasibility indication, may present the low feasibility predicted travel service to the user with a cautionary indication and explanation, or the integration module may iterate to determine an alternative with a higher feasibility indication. If the feasibility score for a predicted travel service is above an upper threshold, the verification module may assign the predicted travel service an indication of high feasibility.

For example, if a predicted travel service is a mode of transportation of a taxi from an airport to an event, but the travel service time between a previous predicted travel service (e.g., an arrival time to the airport) and the start time of the event (e.g., a tee time, a concert time) is insufficient based on likely traffic at the time of travel, then an indication of infeasibility may be assigned. Similarly, if the travel service time is sufficient but does not include a prescribed additional time based on the event (e.g., a tee reservation may require 20 minutes of prescribed additional time for check-in and practice but a concert reservation may require 40 minutes of prescribed additional time for check-in), then an indication of low feasibility may be assigned. As another example, an arrival at an airport may be checked against an average or expected delay. As another example, a layover time may be checked against an average necessary layover time based on a type of layover (e.g., 30 minutes for domestic, 60 minutes for international).

In some embodiments, the verification module may be a machine learning engine.

Step 430 includes outputting feasibility scores or indications of each feasibility score for each predicted travel service. The feasibility scores may be output to integration server 120 for presentation or association with each predicted travel service.

Figure 5:
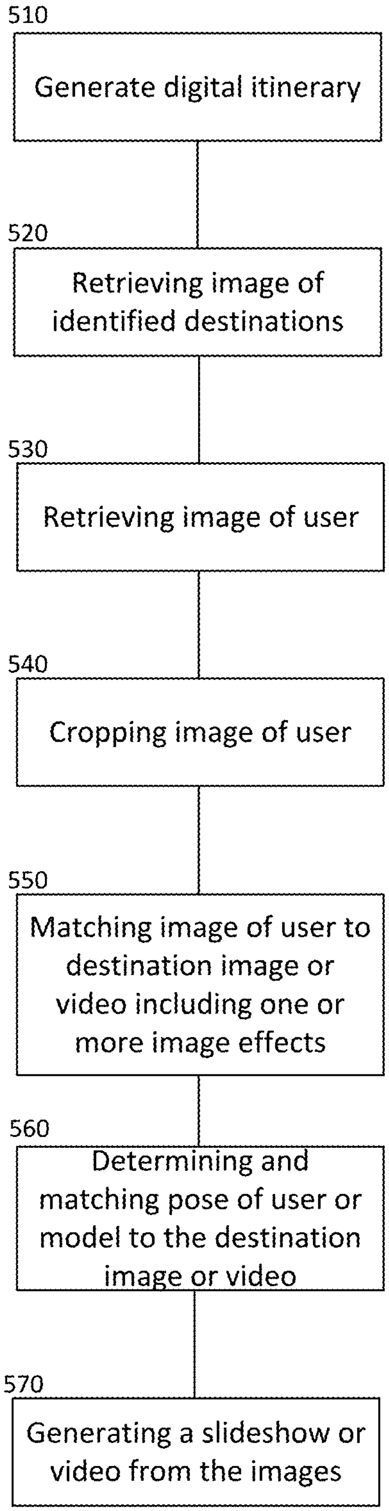
FIG. 5 is a logical flow for providing an artificial intelligence-based planning assistant, in accordance with aspects.

FIG. 5 is a logical flow for providing an artificial intelligence-based planning assistant, in accordance with aspects.

In some embodiments, presenting the digital itinerary (e.g., from step 250) to the user via the interface may include generating an image or a video. For step 510, a digital itinerary may be generated or retrieved. Next, for step 520, generating an image or video may include retrieving a picture or a video associated with a destination (e.g., a photo of the Eiffel Tower). Next, for step 530, generating an image or a video may include further retrieving an image of a user and/or one or more traveling companions and, using a machine learning engine, generating an image or a video of the user at the destination (e.g., a photo of the user at the Eiffel Tower). Next, for step 540, the generation of the image can include cropping around a user's face and/or body.

Next, for step 550, matching may be accomplished by adjusting an image effect including one or more of perception, intensity, shadows, highlights, brightness, color balance, contrast, saturation, dynamism, shadows, sharpness, red eye removal, skin smoothing, objects, of the background and/or the user's face to match (e.g., reduce variance of the user image and the destination image to below a threshold). In some embodiments, the user's face may be re-generated from a user image to match the destination image in the ways disclosed herein (e.g., to match an expected direction angle of the user's face at the destination, a perspective of the user's face from the angle of a view of the destination reflected in the destination image). In some embodiments, matching may be accomplished with a machine learning engine.

Next, for step 560, a pose of a user or user's companions may be associated with the destination may be determined (e.g., from context of an activity associated with the destination) and a pose of the user can then be generated from the user's or companion's face and features to match the one associated with the destination, and displayed in the generated image and/or video. The pose may include adjusting an angle and/or position of the user's neck/torso/arms/legs. In some embodiments, the generated image or video may be of a tour (e.g., walking, riding) of a destination, activity, or event (e.g., a golf course, a hotel room, a hotel lobby). Related to the itinerary, for step 570, the generated image, slideshow, or video may be generated and shown alongside a line item of the itinerary or available through a link associated with the line item. In some embodiments, generating the image or video may be performed by a machine learning engine.

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing machine" a "computing device," an "electronic device," a "mobile device," etc. These may be a computer, a computer server, a host machine, etc. As used herein, the term "processing machine," computing device, "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular step, steps, task, or tasks, such as those steps/tasks described above. Such a set of instructions for performing a particular task may be characterized herein as an application, computer application, program, software program, or simply software. In one aspect, the processing machine may be or include a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

The processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

A machine learning engine consistent with those disclosed herein may use clustering processes to group data points based on their similarity. A machine learning engine consistent with those disclosed herein may use association processes to associate data points based on their similarity. A machine learning engine consistent with those disclosed herein may use classification processes to map input features to predefined classes.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

What is claimed is:

1. A method for determining a travel itinerary comprising:

receiving, from a user interface, a travel request from a user;

deriving, using a first machine learning engine configured with a convolutional neural network trained to identify travel patterns from structured and unstructured data, the first machine learning engine trained and validated from customer profiles, travel preferences, commerce benefits, loyalty rewards, payment options, dining preferences, and historical itineraries, input travel data from a purchase history and a travel history;

providing, by the first machine learning engine, the input travel data to a second machine learning engine implemented as a recurrent neural network optimized for sequential itinerary prediction;

determining, by the second learning engine, travel services based on the input travel data;

receiving, as output from the second machine learning engine, the determined travel services;

formatting, by an integration module of a backend associated with a server comprising a distributed processing architecture that dynamically allocates computational resources based on itinerary complexity, a digital itinerary including the determined travel services as line-item recommendations for the user;

verifying the digital itinerary using a check machine learning engine that compares the determined travel services to real world data and the travel request;

formatting, by the integration module of the backend associated with a server, the digital itinerary including the determined travel services as line-item recommendations for a user;

generating, by an image generation machine learning engine comprising a generative adversarial network (GAN) configured to synthesize user images at identified locations with reduced artifact generation and improved facial alignment, an image of a user associated with the user preference at each identified location, wherein each identified location is based on each of the determined travel services, the determined travel services comprising a hotel room and an event, wherein an adjustment comprises applying a spatial transformer network to align facial features with the destination background;

determining a pose of the user based on a context of an activity associated with the destination, wherein the adjustment comprises generating the pose of the user based on the user's face and features in the image of the user with each identified location and reducing variance of the user images with each identified location;

adjusting, by the image generation machine learning engine, the image to reduce variance of the image of the user and a destination image based on a perspective of a user's face in the image of the user and a view of the identified location in the destination image;

generating, by an integration module, each predicted travel service between travel service locations identified based on each of the determined travel services and the identified locations, the predicted travel services each comprising a mode of transportation and a time for transportation, the mode of transportation comprising one or more of a taxi, a rental car, and a train;

determining, by the check machine learning engine, a feasibility of each predicted travel service and an alternative feasibility for an alternative travel service based on one or more of budget, a time for an activity, an additional time required for the activity, a user profile, and an average delay;

replacing, by the check machine learning engine, the each predicted travel service in the digital itinerary with the alternative travel service if the alternative feasibility for the alternative travel service exceeds the feasibility of the each predicted travel service; and presenting, by the integration module, the digital itinerary to the user via the user interface in real time.

2. The method of claim 1, further comprising generating a video of a user associated with the user preference at an identified location, wherein the identified location is based on the determined travel services.

3. The method of claim 2, further comprising generating the video with the user and a traveling companion of the user.

* * * * *